(12) United States Patent
Wilson

(10) Patent No.: US 11,385,032 B2
(45) Date of Patent: Jul. 12, 2022

(54) ARCHERY TARGET PIN

(71) Applicant: HAMSKEA ARCHERY SOLUTIONS LLC, Frederick, CO (US)

(72) Inventor: Scott Wilson, Brighton, CO (US)

(73) Assignee: HAMSKEA ARCHERY SOLUTIONS LLC, Frederick, CO (US)

(*) Notice: Subject to any disclaimer, the term of this patent is extended or adjusted under 35 U.S.C. 154(b) by 0 days.

(21) Appl. No.: 16/949,162

(22) Filed: Oct. 16, 2020

(65) Prior Publication Data

US 2021/0207930 A1    Jul. 8, 2021

Related U.S. Application Data

(60) Provisional application No. 62/958,333, filed on Jan. 8, 2020.

(51) Int. Cl.
| | | |
|---|---|---|
| *F41J 3/00* | (2006.01) | |
| *B43M 15/00* | (2006.01) | |
| *F16B 15/02* | (2006.01) | |
| *F41J 1/10* | (2006.01) | |

(52) U.S. Cl.
CPC .......... *F41J 3/0004* (2013.01); *B43M 15/00* (2013.01); *F16B 15/02* (2013.01); *F41J 1/10* (2013.01)

(58) Field of Classification Search
CPC .......... A47G 3/00; B43M 15/00; E04H 15/62; E02D 5/80; A63B 57/13; A63B 57/15; F16B 15/02; F41J 3/0004
See application file for complete search history.

(56) References Cited

U.S. PATENT DOCUMENTS

| | | | | |
|---|---|---|---|---|
| 3,846,873 A | * | 11/1974 | Saunders | F41J 3/0004 24/711.2 |
| 10,329,791 B1 | * | 6/2019 | Cauley, Jr. | E04H 15/62 |
| 10,952,508 B2 | * | 3/2021 | Barrah | A47G 3/00 |
| 2001/0030268 A1 | * | 10/2001 | Larson | B43M 15/00 248/74.5 |
| 2005/0003907 A1 | * | 1/2005 | Ijiri | A63B 57/13 473/387 |
| 2013/0233366 A1 | * | 9/2013 | Burgess | E04H 15/62 135/120.1 |
| 2016/0370152 A1 | * | 12/2016 | Tomkins | F41J 1/10 |

OTHER PUBLICATIONS

Lancaster Archery Supply, 2019-2020 Archer's Wishbook, p. 362, available online at www.mydigitalpublication.com/publication/?m=36641&i=588860&p=362&ver=html5 (Year: 2019).*

* cited by examiner

*Primary Examiner* — Laura Davison
(74) *Attorney, Agent, or Firm* — Trenner Law Firm, LLC; Mark D. Trenner

(57) ABSTRACT

An example target pin is disclosed having a body for a removable shaft. The body has a base and a support structure configured to retain the removable shaft substantially perpendicular to the base when the removable shaft is assembled in the support structure of the body. The removable shaft is assembled in the body and is then ready for use by press it through a target into a target backing to hold the target securely in place on the target backing during archery or other target shooting.

14 Claims, 8 Drawing Sheets

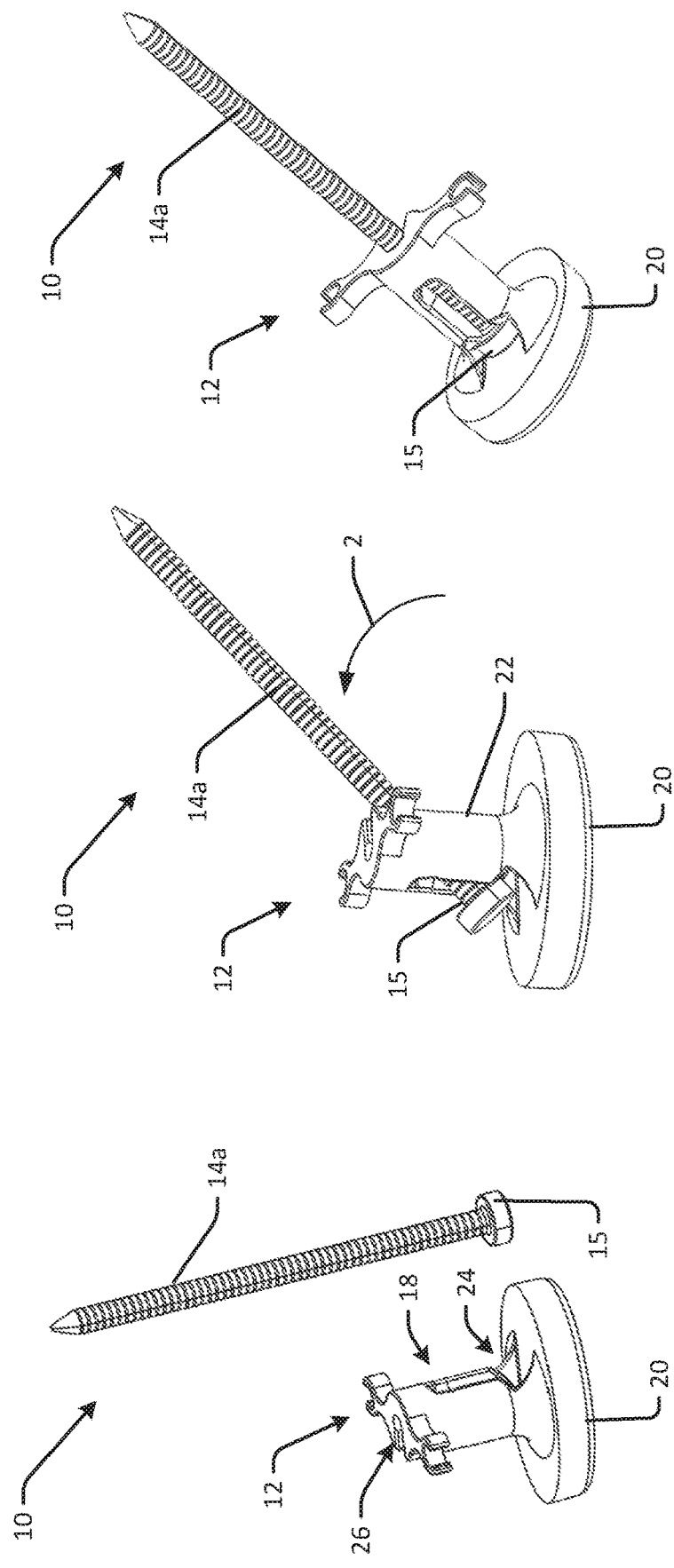

US 11,385,032 B2

ARCHERY TARGET PIN

CROSS REFERENCE TO RELATED APPLICATIONS

This application claims the priority benefit of U.S. Provisional Patent Application No. 62/958,333 filed Jan. 8, 2020 for "Archery Target Pin," hereby incorporated by reference in its entirety as though fully set forth herein.

BACKGROUND

Archery as a target sport is assessed based on the performance of one's ability to launch an arrow from a bow (e.g., longbow, traditional recurve, Olympic recurve or compound bow) that lands in the center of a target. These targets are made from a variety of materials, usually the thickness of heavy paper. These targets are attached to the target butt or backing with pins or nails. Pins and nails can be difficult to remove, as the head of the pins are generally flush with the surface of the target and target butt. The target butts can vary in material to include foam, layers of carpet, layers of polymer sheets, excelsior, and "bag" targets (which are filled with shredded material contained in a nylon weave outer bag).

All of these target butt mediums represent an array of conditions that make it difficult to securely attach and hold an archery target in place. To attach a target to a target butt, on average it requires four (4) pins. When the pins are not in use, the archer has to manage and keep the pins together and organized. Usually a bag is provided for this purpose or the pins are simply left to the archer to manage as individual items, which can result in lost or misplaced pins.

BRIEF DESCRIPTION OF THE DRAWINGS

FIG. 2 illustrates assembly of an example target pin.

DETAILED DESCRIPTION

Target pins are disclosed herein as these may be used to secure targets to target backings. In an example, the target pins are implemented with archery targets. However, it is noted that the target pins disclosed herein are not limited to use only with archery targets, and may be implemented to retain any suitable target (e.g., for target shooting). Indeed, those having ordinary skill in the art will understand these targets to have end-uses in other areas and are not limited only to use with targets.

An example target pin includes interchangeable shafts. In addition, the target pins may be integrated together with other shafts and/or target pin(s) for the purposes of storage and handling. An example of an integrating feature enables each individual target pin to attach to another target pin to help the user manage a set of pins (usually four target pins) when not in use (e.g., during storage, transportations, etc.).

Before continuing, it is noted that as used herein, the terms "includes" and "including" mean, but is not limited to, "includes" or "including" and "includes at least" or "including at least." The term "based on" means "based on" and "based at least in part on."

Figure 1A:
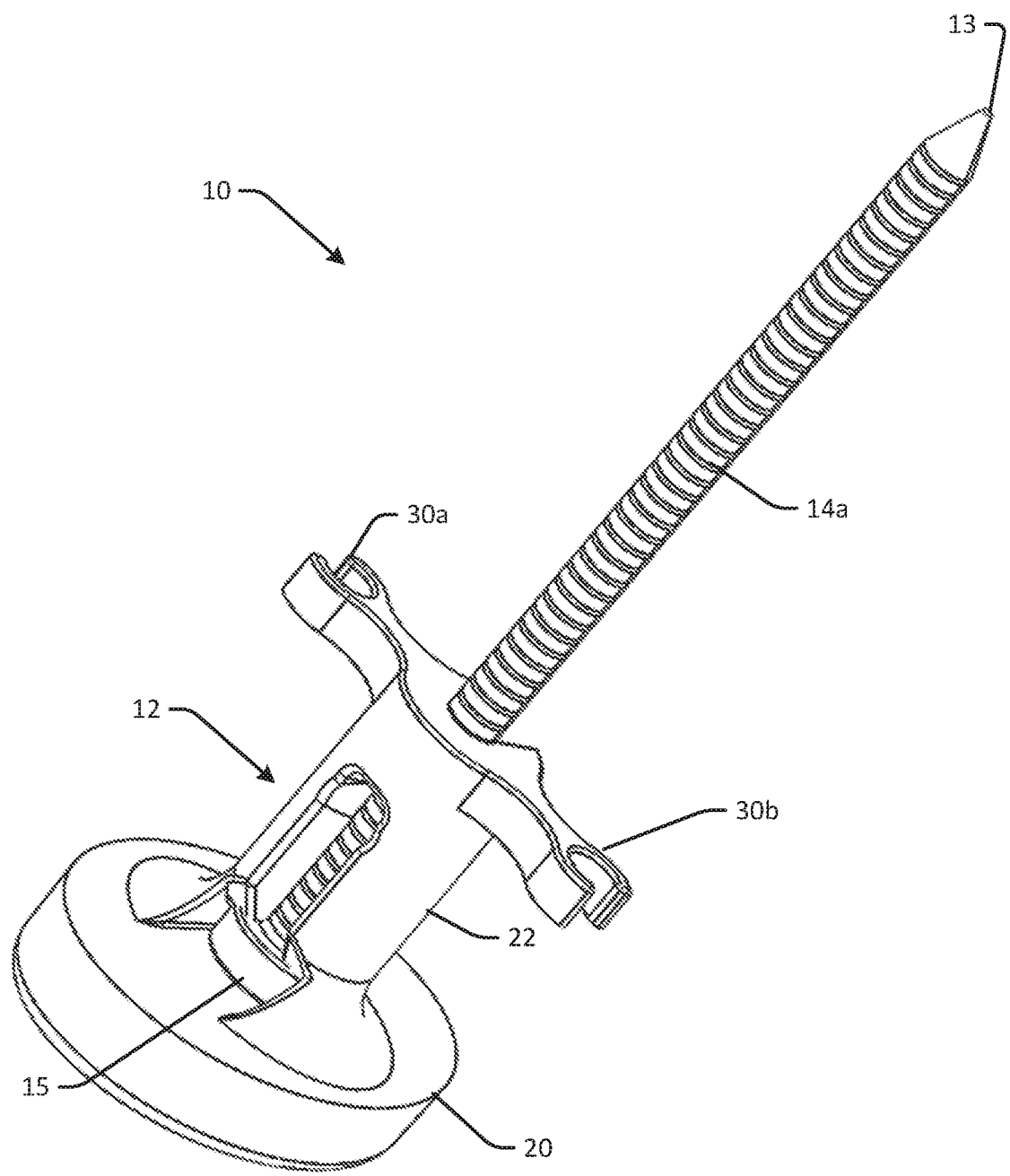
FIG. 1A is a perspective view of an example target pin having a shaft with a ribbed shank.
Figure 1B:
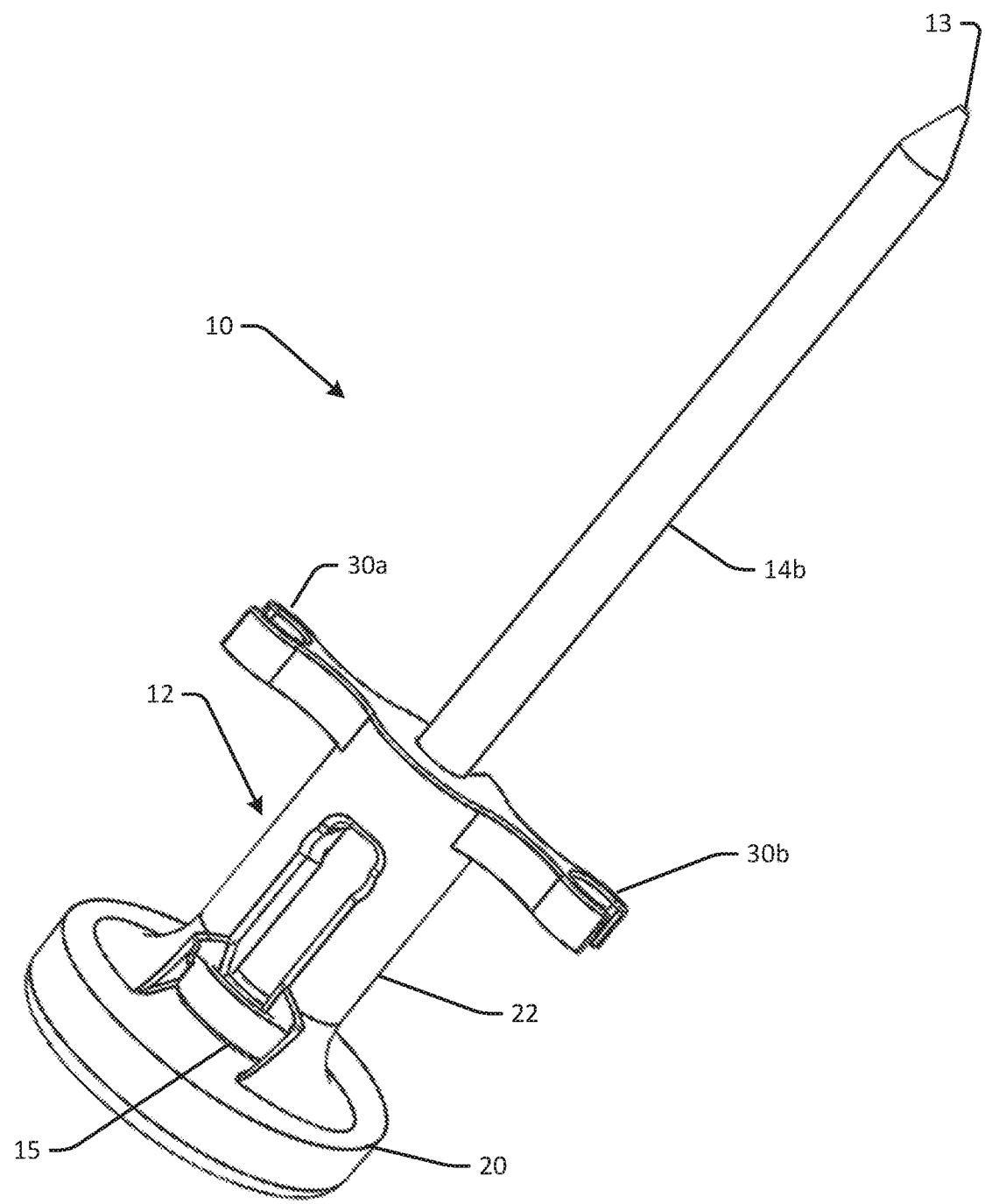
FIG. 1B is a perspective view of an example target pin having a shaft with a smooth shank.

FIG. 1A is a perspective view of an example target pin 10 having a shaft 14a with a ribbed shank. FIG. 1B is a perspective view of an example target pin 10 having a shaft 14b with a smooth shank.

In an example, the target pin 10 includes a body 12 with a support structure having mechanical features that allow the archer or other user the ability to interchange the shaft 14a, 14b for the type of target butt and/or other conditions to hold the aiming target securely in place, e.g., during a competition. When the target pins 10 are not in use to hold the target (or other aiming reference), additional mechanical features in the support structure 22 of the body 12 allow for the shafts 14a, 14b and/or target pins 10 to be assembled together for ease of handling and transportation or storage, and to protect the archer from the sharp tips 13 of the target pins.

Before continuing, it should be noted that the examples described above are provided for purposes of illustration, and are not intended to be limiting. Other devices and/or device configurations may be utilized to carry out the operations described herein.

FIG. 2 illustrates assembly of an example target pin 10. In an example, the shaft 14a (or 14b, or any other shaft) is inserted in a through-hole feature 18 in body 12. When the shaft 14a is rotated (e.g., as illustrated by arrow 2) in the body 12, the end surface or shaft head 15 of the shaft 14a aligns coincident with base portion 20 of the body 12 while simultaneously aligning with guide or support structure 22 where the shaft 14a is received by a support structure 22. When the shaft 14a is seated in the support structure 22 while the shaft head 15 is coincident with the base portion 20 of the body 12, the assembly operations are complete.

In an example, the shaft 14a, 14b can be interchanged to accommodate the target butt and/or other conditions, e.g., by reversing the assembly steps to remove one of the shafts (e.g., shaft 14a) and then repeated with the other shaft (e.g., shaft 14b) to replace it with a shaft having a smooth shank shaft and/or a shaft having a ribbed shank.

The operations shown and described herein are provided to illustrate example implementations. It is noted that the operations are not limited to the ordering shown. Still other operations may also be implemented.

Figure 3A:
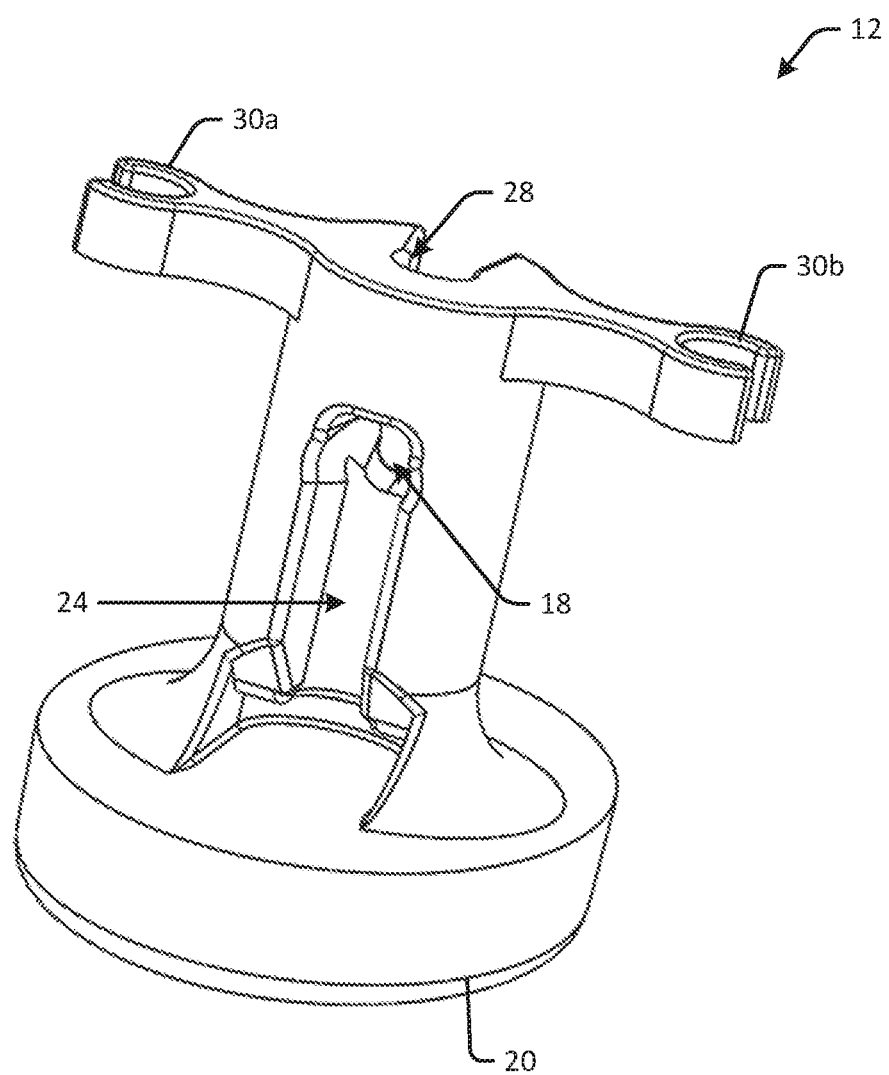
FIG. 3A is a first (e.g., front) side perspective view of a body of the example target pin shown in FIGS. 1 and 2.
Figure 3B:
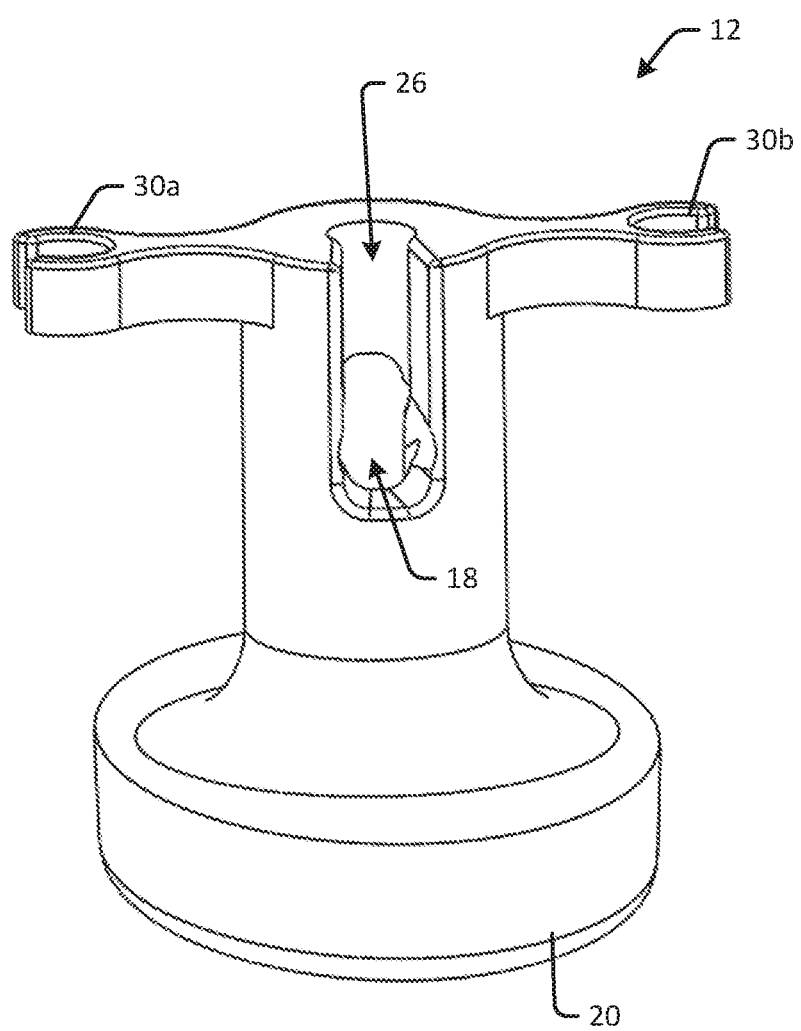
FIG. 3B is a second (e.g., back) side perspective view of a body of the example target pin shown in FIGS. 1 and 2.
Figure 4A:
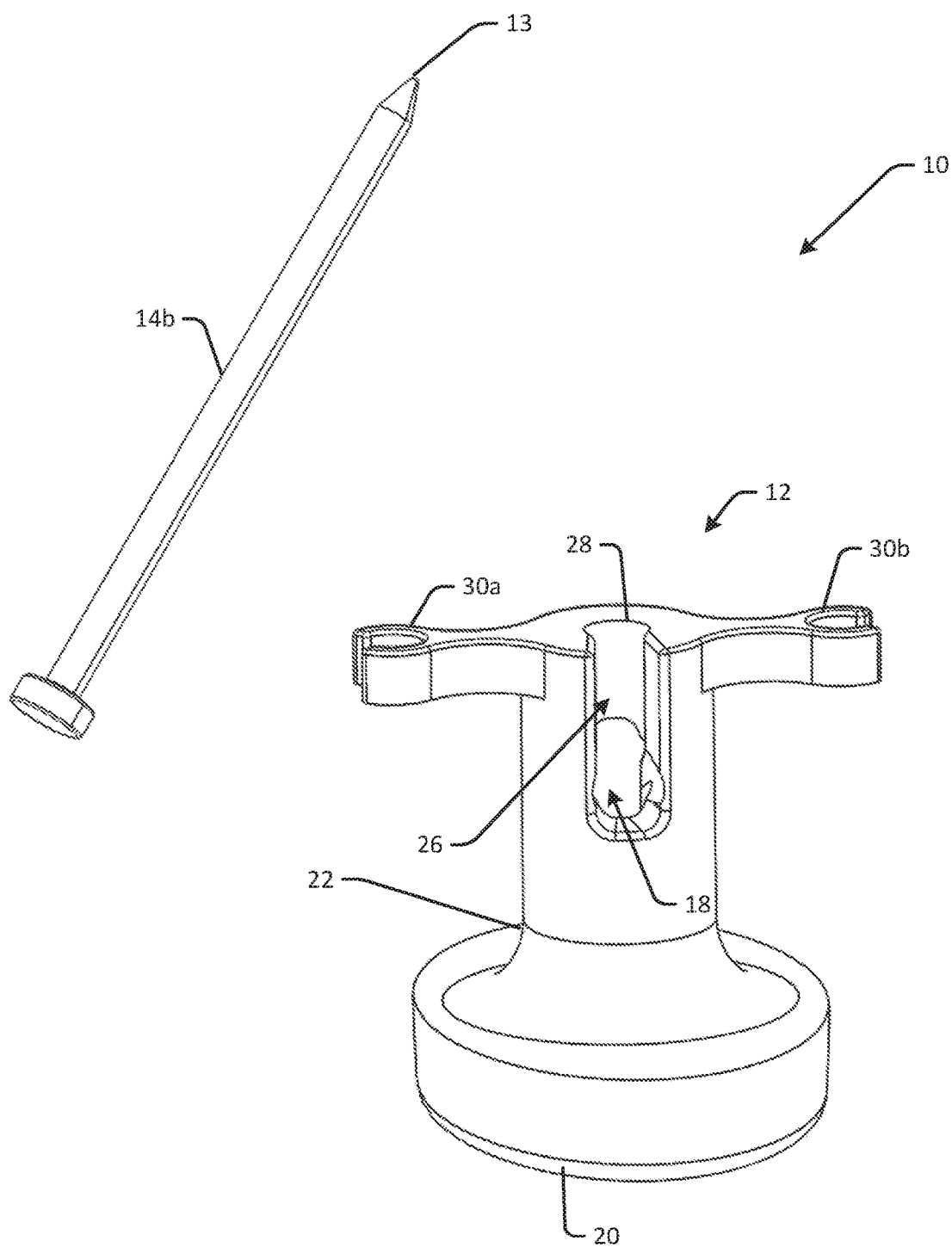
FIG. 4A is a perspective view of an unassembled target pin.
Figure 4B:
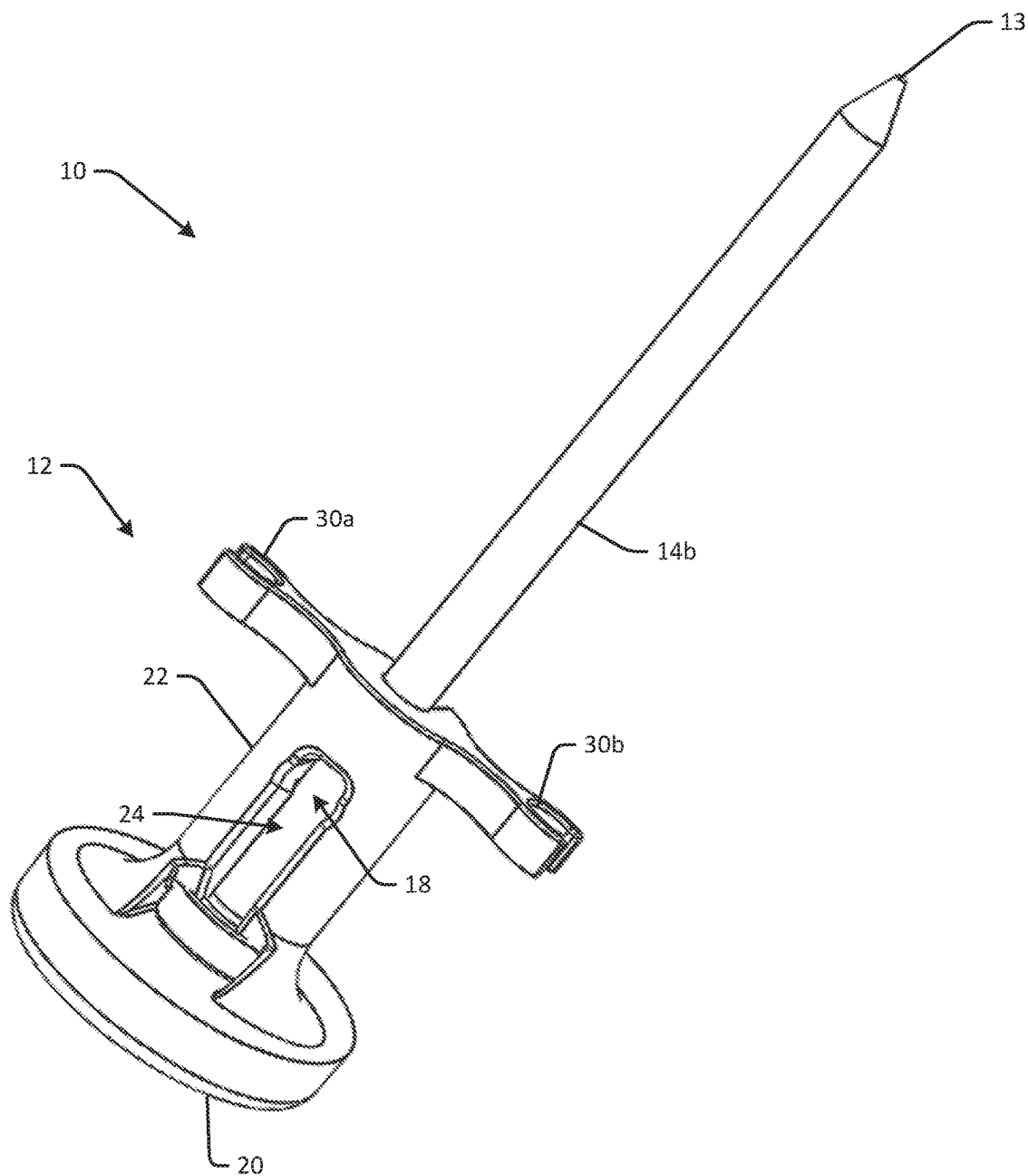
FIG. 4B is a perspective view of an assembled target pin.

FIG. 3A is a first (e.g., front) side perspective view of the body 12 of the example target pin 10 shown in FIGS. 1 and 2. FIG. 3B is a second (e.g., back) side perspective view of the body 12 of the example target pin 10 shown in FIGS. 1 and 2. FIG. 4A is a perspective view of an unassembled target pin 10. FIG. 4B is a perspective view of an assembled target pin 10. The example target pin 10 is shown having a removable shaft 14b and a body 12 having a base 20 and a support structure 22 on the base 20.

The support structure 22 is configured to retain the removable shaft 14b substantially perpendicular to the base 20 (see FIG. 4B) when the removable shaft 14b is assembled in the support structure 22 of the body 12. The removable shaft 14b is assembled in the body 12 and then it can be pressed through a target into a target backing to hold the target securely in place on the target backing during archery or other target shooting.

In an example, a first elongated opening 26 extends between a middle portion and an upper portion of a first side of the support structure 22. A second elongated opening 24 extends between a middle portion and a lower portion of a second side of the support structure 22. In this example, the first side is opposite of the second side of the support structure 22.

In an example, a portion of the first elongated opening 26 overlaps with a portion of the second elongated opening 24 to form the through-hole opening 18 between the first side and the second side of the support structure 22.

In an example, a tip 13 of the removable shaft 14*b* is inserted into the through-hole opening 18 on the second side of the support structure 22. Then the shaft 14*b* is rotated such that the shaft 14*b* enters the support structure 22 and is maintained substantially perpendicular to the base 20 by the support structure 22. For example, the removable shaft 14*b* may have a flat head portion 15. When the shaft 14*b* is rotated into the support structure 22, the flat head 15 of the shaft 14*b* aligns coincident with the base 20 while simultaneously fitting lengthwise through the first elongated opening 26.

In an example, the support structure 22 has a detent feature 28. Assembly of the shaft 14*b* into the body 12 is completed when the removable shaft 14*b* is seated in the detent feature 28 and the flat head 15 of the shaft 14*b* is coincident with the base 20.

Figure 5:
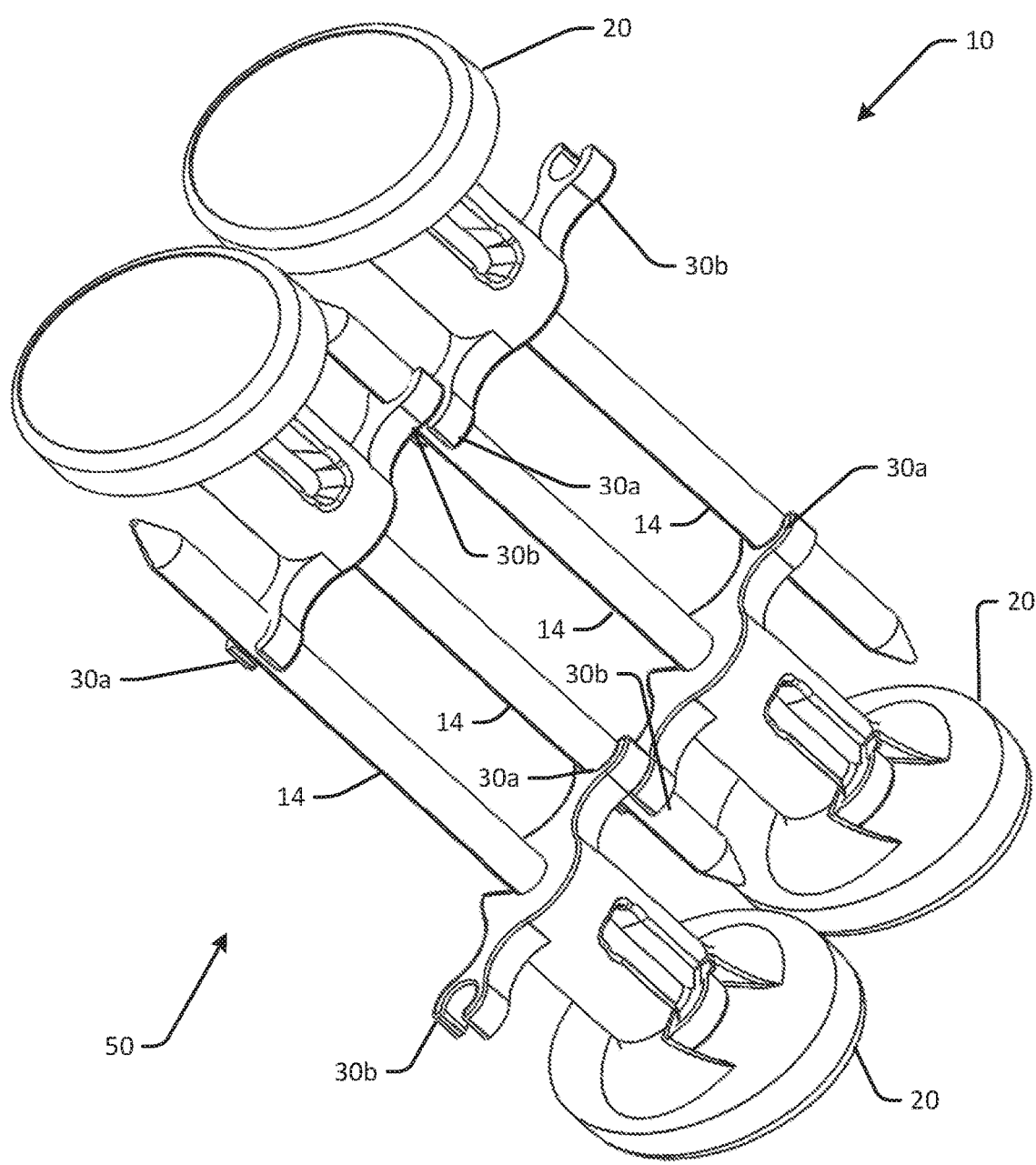
FIG. 5 is a perspective view of an example group of target pin assemblies.

FIG. 5 is a perspective view of an example group of target pin assemblies 50. When the target pins 10 are not in use, a feature (e.g., connectors 30*a*, 30*b*) on the body 12 receives the shaft of each adjacent pin to form a group of target pins 50.

In an example, the support structure 22 includes one or more connector (e.g., connectors 30*a*, 30*b*) for accepting a shank of another shaft to hold the both shafts adjacent to the support structure 22 or another feature of the target pin 10. As such, a single body 12 may hold multiple shafts. In another example, the other shaft(s) can be installed in another target pin and the target pins connected to one another (e.g., as shown in FIG. 5).

In an example, a first shaft is connected to the support structure 22 in a direction that is facing opposite another shaft, and so forth for as many shafts that are connected. As such, the pointed ends of the shaft are protected so that these do not poke the user's hand (or through the user's pocket).

In an example, the connectors 30*a*, 30*b* are situated on the support structure at about 180 degrees apart from the second connector. However, more than 2 connectors 30*a*, 30*b* may be provided and spaced apart from each other (e.g., 3 connectors at 120 degrees apart from one another; 4 connectors at 90 degrees apart from one another, etc.).

It is noted that the examples shown and described are provided for purposes of illustration and are not intended to be limiting. Still other examples are also contemplated.

The invention claimed is:

1. A target pin, comprising:
   a removable shaft; and
   a body having a base and a support structure on the base, the support structure configured to retain the removable shaft substantially perpendicular to the base when the removable shaft is assembled in the support structure of the body;
   wherein the removable shaft is assembled in the body and pressed through a target into a target backing to hold the target securely in place on the target backing during archery or other target shooting;
   a first elongated opening extending between a middle portion and an upper portion of a first side of the support structure; and
   a second elongated opening extending between a middle portion and a lower portion of a second side of the support structure;
   wherein the first side is opposite of the second side of the support structure;
   wherein a portion of the first elongated opening overlaps with a portion of the second elongated opening to form a through-hole opening between the first side and the second side of the support structure.

2. The target pin of claim 1, wherein a tip of the removable shaft is inserted into the through-hole opening on the second side of the support structure and then the shaft is rotated such that the shaft enters the support structure and is maintained substantially perpendicular to the base by the support structure.

3. The target pin of claim 2, wherein the removable shaft includes a head portion.

4. The target pin of claim 3, wherein when the shaft is rotated into the support structure, the head portion of the shaft aligns with the base while the shaft simultaneously fits lengthwise through the first elongated opening.

5. The target pin of claim 4, further comprising a detent feature of the support structure.

6. The target pin of claim 5, wherein assembly of the shaft into the body is completed when the removable shaft is seated in the detent feature and the head portion of the shaft is aligned with the base.

7. The target pin of claim 1, wherein the removable shaft is interchangeable with another removable shaft.

8. The target pin of claim 1, wherein the removable shaft has a smooth shank.

9. The target pin of claim 1, wherein the removable shaft has a ribbed shank.

10. The target pin of claim 1, wherein the body includes at least a first connector for connecting to a feature of a second target pin to hold the second target pin adjacent the support structure.

11. The target pin of claim 10, wherein the body includes at least a second connector for connecting to a feature of a third target pin to hold the third target pin adjacent the support structure.

12. The target pin of claim 11, wherein the first connector is situated on the body at about 180 degrees apart from the second connector.

13. A target pin, comprising:
   a removable shaft; and
   a body having a base and a support structure on the base, the support structure configured to retain the removable shaft substantially perpendicular to the base when the removable shaft is assembled in the support structure of the body;
   a first elongated opening extending between a middle portion and an upper portion of a first side of the body;
   a second elongated opening extending between a middle portion and a lower portion of a second side of the body, the first side is opposite of the second side of the body; and
   a through-hole opening between the first side and the second side of the body;
   wherein a tip of the removable shaft is inserted into the through-hole opening on the second side of the body and then the shaft is rotated such that the shaft is maintained substantially perpendicular to the base by the support structure;
   wherein the removable shaft is assembled in the body and pressed through a target into a target backing to hold the target securely in place on the target backing during archery or other target shooting.

14. A target pin system, comprising:
a first target pin having a first shaft and a body, the body including a base and a support structure on the base, the support structure configured to retain the first shaft substantially perpendicular to the base of the first target pin when the first shaft is in the body of the first target pin; and
a second target pin connected to the body of the first target pin in a direction facing opposite the first shaft;
wherein the first target pin is removed from the second target pin and pressed through a target into a target backing to hold the target securely in place on the target backing during archery or other target shootings;
wherein the body of the first target pin includes:
a first elongated opening extending between a middle portion and an upper portion of a first side of the support structure of the first target pin; and
a second elongated opening extending between a middle portion and a lower portion of a second side of the support structure of the first target pin;
wherein the first side is opposite of the second side of the support structure of the first target pin;
wherein a portion of the first elongated opening overlaps with a portion of the second elongated opening to form a through-hole opening between the first side and the second side of the support structure of the first target pin.

\* \* \* \* \*